United States Patent
Tang

(10) Patent No.: US 10,986,696 B2
(45) Date of Patent: Apr. 20, 2021

(54) METHOD AND DEVICE FOR WIRELESS COMMUNICATION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 26 days.

(21) Appl. No.: 16/578,147

(22) Filed: Sep. 20, 2019

(65) Prior Publication Data
US 2020/0015317 A1 Jan. 9, 2020

Related U.S. Application Data

(63) Continuation of application No. PCT/CN2017/077933, filed on Mar. 23, 2017.

(51) Int. Cl.
*H04W 80/08* (2009.01)
*H04W 24/10* (2009.01)
(Continued)

(52) U.S. Cl.
CPC .......... *H04W 80/08* (2013.01); *H04L 1/0026* (2013.01); *H04L 5/0055* (2013.01); *H04W 24/10* (2013.01); *H04W 28/06* (2013.01); *H04W 72/046* (2013.01)

(58) Field of Classification Search
CPC ..... H04W 40/12; H04W 80/08; H04W 24/10; H04W 28/0236; H04W 72/046;
(Continued)

(56) References Cited

U.S. PATENT DOCUMENTS

2014/0016497 A1 1/2014 Seo et al.
2015/0085800 A1 3/2015 Sivanesan et al.
(Continued)

FOREIGN PATENT DOCUMENTS

CN 104581824 A 4/2015
CN 105101253 A 11/2015
(Continued)

OTHER PUBLICATIONS

InterDigital Communications: "Packet Duplication at PDCP", R2-1701186 (NR SI AI10212) URLLC Packet Duplication at PDCP; 3GPP; Mobile Competence Centre; 650, Route Des Lucioles; F-06921 Sophia-Antipolis Cedex, vol. RAN WG2, No. Athens, Greece; Feb. 13, 2017-Feb. 17, 2017; Feb. 4, 2017 (Feb. 4, 2017); XP051223409.
(Continued)

*Primary Examiner* — Brian D Nguyen
(74) *Attorney, Agent, or Firm* — Ladas & Parry, LLP

(57) ABSTRACT

Embodiments of the present application provide a method and a device for wireless communication, which can balance the relationship between resource utilization and transmission reliability. The method includes: a network device determines a transmission mode of a packet data convergence protocol PDCP protocol data unit PDU, where the transmission mode includes a duplicate data transmission mode or a single link transmission mode; and the network device transmits the PDCP PDU to the terminal according to the transmission mode of the PDCP PDU.

11 Claims, 4 Drawing Sheets

200

A network device determines a transmission mode of a PDCP PDU, where the transmission mode includes a duplicate data transmission mode or a single link transmission mode ~210

The network device transmits the PDCP PDU to the terminal device according to the transmission mode of the PDCP PDU ~220

(51) Int. Cl.
*H04W 28/06* (2009.01)
*H04W 72/04* (2009.01)
*H04L 1/00* (2006.01)
*H04L 5/00* (2006.01)

(58) Field of Classification Search
CPC ... H04W 28/06; H04W 28/0252; H04L 1/0026; H04L 5/0055; H04L 45/24
See application file for complete search history.

(56) References Cited

U.S. PATENT DOCUMENTS

| | | | |
|---|---|---|---|
| 2015/0270917 A1* | 9/2015 | Roman | H04J 11/005 370/329 |
| 2016/0020929 A1* | 1/2016 | Yamazaki | H04L 25/4906 375/300 |
| 2017/0331577 A1* | 11/2017 | Parkvall | H04L 29/06231 |
| 2019/0327641 A1* | 10/2019 | Mok | H04W 4/40 |
| 2019/0349135 A1* | 11/2019 | Xu | H04L 1/188 |
| 2020/0059821 A1* | 2/2020 | Wirth | H04L 5/0094 |
| 2020/0092746 A1* | 3/2020 | Baek | H04W 28/06 |
| 2020/0204221 A1* | 6/2020 | Tong | H04L 5/0051 |
| 2020/0314839 A1* | 10/2020 | Futaki | H04W 52/367 |

FOREIGN PATENT DOCUMENTS

| | | |
|---|---|---|
| JP | 2003347980 A | 12/2003 |
| JP | 2017500768 A | 1/2017 |
| KR | 20160094337 A | 8/2016 |
| WO | 2016028563 A1 | 2/2016 |
| WO | 2017032338 A1 | 3/2017 |

OTHER PUBLICATIONS

Nokia et al: "Discussion on the support for packet duplication", R2-1701861 Packet Duplication; 3GPP; Mobile Competence Centre; 650, Route Des Lucioles; F-06921 Sophia-Antipolis Cedex, vol. RAN WG2, No. Athens, Greece; Feb. 13, 2017-Feb. 17, 2017; Feb. 4, 2017 (Feb. 4, 2017); XP051223746.
The Extended European Search Report dated Jan. 2, 2020.
International Search Report in international application No. PCT/CN2017/077933, dated Dec. 22, 2017.
The first Office Action of corresponding European application No. 17902353.6, dated Sep. 15, 2020.
Ericsson:"Further aspects of data duplication in PDCP layer", 3GPP Draft; R2-1700834-Further Aspects of Data Duplication in PDCP Layer, 3rd Generation Partnership Project (3GPP), Mobile Competence Centre; 650, Route Des Lucioles; F-06921 Sophia-Antipolis CED, vol. RAN WG2, No. Athens, Greece; Feb. 13, 2017-Feb. 17, 2017 Feb. 12, 2017(Feb. 12, 2017), XP051211616.
The first Office Action of corresponding Indian application No. 201917040073, dated Feb. 25, 2021.
The first Office Action of corresponding Japanese application No. 2019-552061, dated Feb. 26, 2021.
Samsung, Considerations on Packet Duplication for URLLC, 3GPP TSG RAN WG2 #97 R2-1701986, Feb. 4, 2017.

* cited by examiner

200

A network device determines a transmission mode of a PDCP PDU, where the transmission mode includes a duplicate data transmission mode or a single link transmission mode ~210

The network device transmits the PDCP PDU to the terminal device according to the transmission mode of the PDCP PDU ~220

METHOD AND DEVICE FOR WIRELESS COMMUNICATION

CROSS-REFERENCE TO RELATED APPLICATIONS

This application is a continuation of International Application No. PCT/CN2017/077933, filed on Mar. 23, 2017, entitled "METHOD AND DEVICE FOR WIRELESS COMMUNICATION", the content of which is incorporated herein by reference in its entirety.

TECHNICAL FIELD

The present application relates to the field of communications and, more particularly, to a method and a device for wireless communication.

BACKGROUND

In a carrier aggregation scenario, the packet data convergence protocol (PDCP) layer in the transmitter can support data duplication, that is, to duplicate a PDCP protocol data unit (PDU) into two duplications (possibly multiple duplications), in order to improve the reliability of data transmission. In the existing technology, a duplicate data transmission mode is used directly, resulting in an extremely low resource utilization.

SUMMARY

Embodiments of the present application provide a method and a device for wireless communication, which can balance the relationship between resource utilization and transmission reliability.

In a first aspect, a method for wireless communication is provided, including:

determining, by a network device, a transmission mode of a packet data convergence protocol PDCP protocol data unit PDU, where the transmission mode includes a duplicate data transmission mode or a single link transmission mode; and transmitting, by the network device, the PDCP PDU to a terminal device according to the transmission mode of the PDCP PDU.

By dynamically switching the data transmission mode, resource utilization and reliability of data transmission can be balanced effectively.

Specifically, the transmission mode of the corresponding PDCP PDU can be determined according to the reliability requirement of the data itself, thereby effectively balancing resource utilization and reliability of data transmission.

The duplicate data transmission mode refers to a mode that duplicates one PDCP PDU into multiple duplications and transmits the multiple duplications on plurality of links respectively; and the single link transmission mode refers to a mode that one PDCP PDU is transmitted once on one link.

With reference to the first aspect, in a possible implementation manner of the first aspect, where the determining, by a network device, a transmission mode of a PDCP PDU, includes:

determining, by the network device, a transmission mode of the PDCP PDU according to feedback information from the terminal device on a plurality of links between the network device and the terminal device.

With reference to the first aspect, or any one of the foregoing possible implementation manners, in a possible implementation manner of the first aspect, where the determining, by a network device, a transmission mode of a PDCP PDU, includes:

performing, by the network device, channel estimation on uplink data transmitted on the plurality of links between the network device and the terminal device to obtain a first estimated value; and determining the transmission mode of the PDCP PDU by using the first estimated value of each link.

With reference to the first aspect, or any one of the foregoing possible implementation manners, in a possible implementation manner of the first aspect, where the determining the transmission mode of the PDCP PDU using the first estimated value of each link includes:

determining the transmission mode to be the duplicate data transmission mode when a difference value between first estimated values of each two of the plurality of links is less than or equal to a first predetermined value, and the first estimated value of each of the plurality of links is within a first predetermined range; or determining the transmission mode to be the single link transmission mode when a difference value between first estimated values of at least two links among the plurality of links is greater than the first predetermined value, or a first estimated value of at least one link among the plurality of links is not within the first predetermined range.

With reference to the first aspect, or any one of the foregoing possible implementation manners, in a possible implementation manner of the first aspect, where the determining, by a network device, a transmission mode of a PDCP PDU, includes:

performing, by the network device, channel estimation on uplink data transmitted on the plurality of links between the network device and the terminal device within a first time range to obtain the first estimated value;

determining the transmission mode of the PDCP PDU using the first estimated value obtained within the first time range; and the transmitting, by the network device, the PDCP PDU to a terminal device according to the transmission mode of the PDCP PDU, includes:

transmitting, by the network device, the PDCP PDU to the terminal device within a second time range by using the transmission mode.

With reference to the first aspect, or any one of the foregoing possible implementation manners, in a possible implementation manner of the first aspect, where the feedback information from the terminal device on a plurality of links between the network device and the terminal device includes at least one of the following:

channel state information obtained by the terminal device on each of the plurality of links;

feedback of a result of data demodulation by the terminal device on each of the plurality of links;

a radio resource management RRM measurement result of an RRM measurement by the terminal device on each of the plurality of links;

a second estimated value obtained by the terminal device by performing channel estimation on a control signaling transmitted on each of the plurality of links; and a beam measurement result obtained by the terminal device by measuring a beam transmitted on each of the plurality of links.

With reference to the first aspect, or any one of the foregoing possible implementation manners, in a possible implementation manner of the first aspect, where the feedback information includes the channel state information, the RRM measurement result, the second estimated value, and the beam measurement result;

the determining, by the network device, a transmission mode of the PDCP PDU according to feedback information from the terminal device on a plurality of links between the network device and the terminal device, includes:

determining the transmission mode to be the duplicate data transmission mode when a difference value between values of feedback information of each two of the plurality of links is less than or equal to a second predetermined value, and a value of feedback information of each of the plurality of links is within a second predetermined range; or determining the transmission mode to be the single link transmission mode when a difference value between values of feedback information of at least two links among the plurality of links is greater than the second predetermined value, or a value of feedback information of at least one link among the plurality of links is not within the second predetermined range.

With reference to the first aspect or any one of the foregoing possible implementation manners, in a possible implementation manner of the first aspect, where the determining, by the network device, a transmission mode of the PDCP PDU according to feedback information from the terminal device on a plurality of links between the network device and the terminal device, includes:

determining the transmission mode of the PDCP PDU according to feedback information on a plurality of links between the network device and the terminal device received from the terminal device within a third time range;

the transmitting, by the network device, the PDCP PDU to a terminal device according to the transmission mode of the PDCP PDU includes:

transmitting, by the network device, the PDCP PDU to the terminal device within a fourth time range by using the transmission mode.

With reference to the first aspect, or any one of the foregoing possible implementation manners, in a possible implementation manner of the first aspect, where the feedback information from the terminal device on a plurality of links between the network device and the terminal device includes feedback of the result of data demodulation by the terminal device on each link, where the feedback of the result of demodulation includes an acknowledgement ACK message or a negative acknowledgement NACK message;

the determining, by the network device, a transmission mode of the PDCP PDU according to feedback information from the terminal device on a plurality of links between the network device and the terminal device, includes:

determining the transmission mode of the PDCP PDU according to at least one of a number of ACK messages or a number of NACK messages received on each link within the third time range.

With reference to the first aspect, or any one of the foregoing possible implementation manners, in a possible implementation manner of the first aspect, where the determining the transmission mode of the PDCP PDU according to at least one of a number of ACK messages received on each link or a number of NACK messages received on the each link within the third time range includes:

determining the transmission mode of the PDCP PDU links according to at least one of a ratio of the number of ACK messages received on each link to the number of NACK messages received on the each link, or a difference value between ratios of a number of ACK messages to a number of NACK messages of any two links among the plurality of links within the third time range.

With reference to the first aspect, or any one of the foregoing possible implementation manners, in a possible implementation manner of the first aspect, where the determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links includes:

determining the transmission mode of the PDCP PDU to be the duplicate data transmission mode when a ratio of the number of ACK messages received on each of the plurality of links to the number of NACK messages received on the each of the plurality of links is within a third predetermined range, and a difference value between ratios of a number of ACK messages to a number of NACK messages of any two of the plurality of links is less than or equal to a third predetermined value.

With reference to the first aspect, or any one of the foregoing possible implementation manners, in a possible implementation manner of the first aspect, where the determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links includes:

determining the transmission mode of the PDCP PDU to be the single link transmission mode when there is the first link among the plurality of links, where a ratio of a number of ACK messages on the first link to a number of NACK messages on the first link is greater than a ratio of a number of ACK messages on any other link among the plurality of links to a number of NACK messages on the any other link among the plurality of links, and a difference value between the ratio of the number of ACK messages on the first link to the number of NACK messages on the first link and the ratio of the number of ACK messages on the any other link among the plurality of links to the number of NACK messages on any other link among the plurality of links is greater than or equal to a fourth predetermined value.

With reference to the first aspect or any one of the foregoing possible implementation manners, in a possible implementation manner of the first aspect, where the transmitting, by the network device, the PDCP PDU to a terminal device according to the transmission mode of the PDCP PDU includes:

transmitting, by the network device, the PDCP PDU to the terminal device by using the first link.

With reference to the first aspect, or any one of the foregoing possible implementation manners, in a possible implementation manner of the first aspect, where the determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links includes:

determining the transmission mode of the PDCP PDU to be the single link transmission mode when a ratio of the number of ACK messages received on each of the plurality of links to the number of NACK messages received on the each of the plurality of links is greater than or equal to a fifth predetermined value, and a difference value between ratios of a number of ACK messages to a number of NACK messages of any two of the plurality of links is less than or equal to a sixth predetermined value.

With reference to the first aspect, or any one of the foregoing possible implementation manners, in a possible implementation manner of the first aspect, where the transmitting, by the network device, the PDCP PDU to a terminal device according to the transmission mode of the PDCP PDU includes:

transmitting, by the network device, the PDCP PDU to the terminal device by using a second link among the plurality of links, where the second link is a link having the highest ratio of a number of ACK messages to a number of NACK messages among the plurality of links.

With reference to the first aspect, or any one of the foregoing possible implementation manners, in a possible implementation manner of the first aspect, where the determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links includes:

determining the transmission mode of the PDCP PDU to be the single link transmission mode or the duplicate data transmission mode when a ratio of the number of ACK messages received on each of the plurality of links to the number of NACK messages received on the each of the plurality of links is less than or equal to a seventh predetermined value.

With reference to the first aspect, or any one of the foregoing possible implementation manners, in a possible implementation manner of the first aspect, where the transmitting, by the network device, the PDCP PDU to a terminal device according to the transmission mode of the PDCP PDU includes:

selecting at least one link from the plurality of links according to the transmission mode of the PDCP PDU;

performing link adaptation on the at least one link; and transmitting the PDCP PDU by using the at least one link after link adaptation.

With reference to the first aspect, or any one of the foregoing possible implementation manners, in a possible implementation manner of the first aspect, where the plurality of links have a one-to-one correspondence with a plurality of carriers, and each of the plurality of links performs signal transmission through a corresponding carrier.

In a second aspect, a network device is provided, which may include units for implementing the method of the first aspect or any of the possible implementations mentioned above.

In a third aspect, a network device is provided, which may include a memory and a processor, where the memory stores instructions, and the processor is configured to call the instructions stored in the memory to perform the method of the first aspect or any optional implementation manners of the first aspect.

In a fourth aspect, a computer readable medium is provided, the computer readable medium storing program code for execution by a network device, where the program code including instructions for performing the method of the first aspect or various implementations thereof.

BRIEF DESCRIPTION OF DRAWINGS

In order to illustrate the technical solutions of embodiments of the present application, the drawings used in the embodiments of the present application or the prior art will be briefly described below. It is apparent that the drawings in the following description are only some embodiments of the present application; other drawings may be obtained by those of ordinary skill in the art without any creative efforts.

DESCRIPTION OF EMBODIMENTS

The technical solutions of embodiments of the present application are described below with reference to the accompanying drawings of the embodiments of the present invention. It is apparent that the described embodiments are merely part of, rather than all of, embodiments of the present application, and all other embodiments obtained by those skilled in the art without any creative efforts shall fall within the scope of protection of the present application.

The technical solutions of the embodiments of the present invention can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunication system (UMTS), a worldwide interoperability for microwave access (WiMAX) communication system, a future evolved public land mobile network (PLMN) or a 5G system in future, etc.

Figure 1:
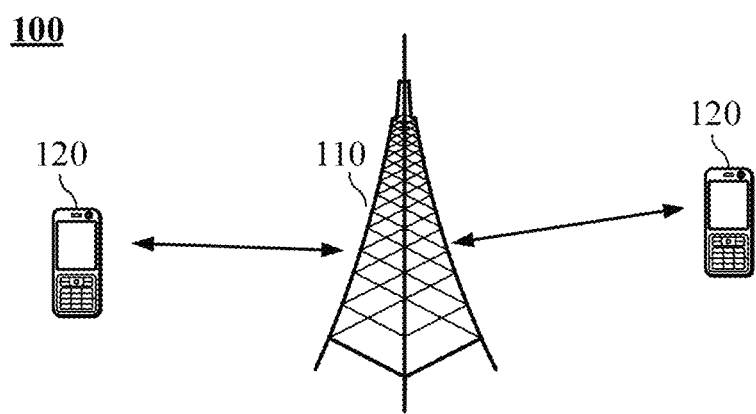
FIG. 1 is a schematic diagram of a wireless communication system according to an embodiment of the present application.

FIG. 1 shows a wireless communication system 100 to which an embodiment of the present invention is applied. The wireless communication system 100 may include a network device 110. The network device 110 may be a device that communicates with a terminal device. The network device 110 can provide communication coverage for a specific geographic area and can communicate with a terminal device located within the coverage area. The network device 110 may be a base transceiver station (BTS) in a GSM system or a CDMA system, or may be a nodeB (NB) in a WCDMA system, or may be an Evolutional Node B (eNB or eNodeB) in an LTE system, or may be a wireless controller in a cloud radio access network (CRAN), or a relay station, an access point, an in-vehicle device, a wearable device, a network side device, a transmission point in a future 5G network, or a network device in a future evolved PLMN and the like.

The wireless communication system 100 further includes at least one terminal device 120 located in the coverage range of the network device 110. The terminal device 120 may be mobile or fixed. The terminal device 120 may refer to an access terminal, a user equipment (UE), a user unit, a user station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a wireless communication capability, a computing device with a wireless communication capability or other processing device connected to a wireless modem, an in-vehicle device, a wearable device, a terminal device in a future 5G network, or a terminal device in a future evolved PLMN etc.

In an embodiment, device to device (D2D) communications are allowed between terminal devices 120.

In an embodiment, the 5G system or network can be called new radio (NR) system or network.

FIG. 1 exemplarily shows one network device and two terminal devices. In an embodiment, the wireless communication system 100 may include a plurality of network devices and may include other numbers of terminal devices within the coverage of each network device, which is not limited in the embodiment of the present application.

In an embodiment, the wireless communication system 100 may further includes a network controller, a mobile management entity and other network entities, which is not limited in the embodiment of the present application.

It should be understood that the terms "system" and "network" are used interchangeably herein. The term "and/or" in this context is merely associating relationship describing associated objects, indicating that there may be three relationships. For example, A and/or B may indicate that there only exists A, there exist both A and B, there only exists B. these three situations. In addition, the character "/" herein generally indicates an "or" relationship between the associated objects.

Figure 2:
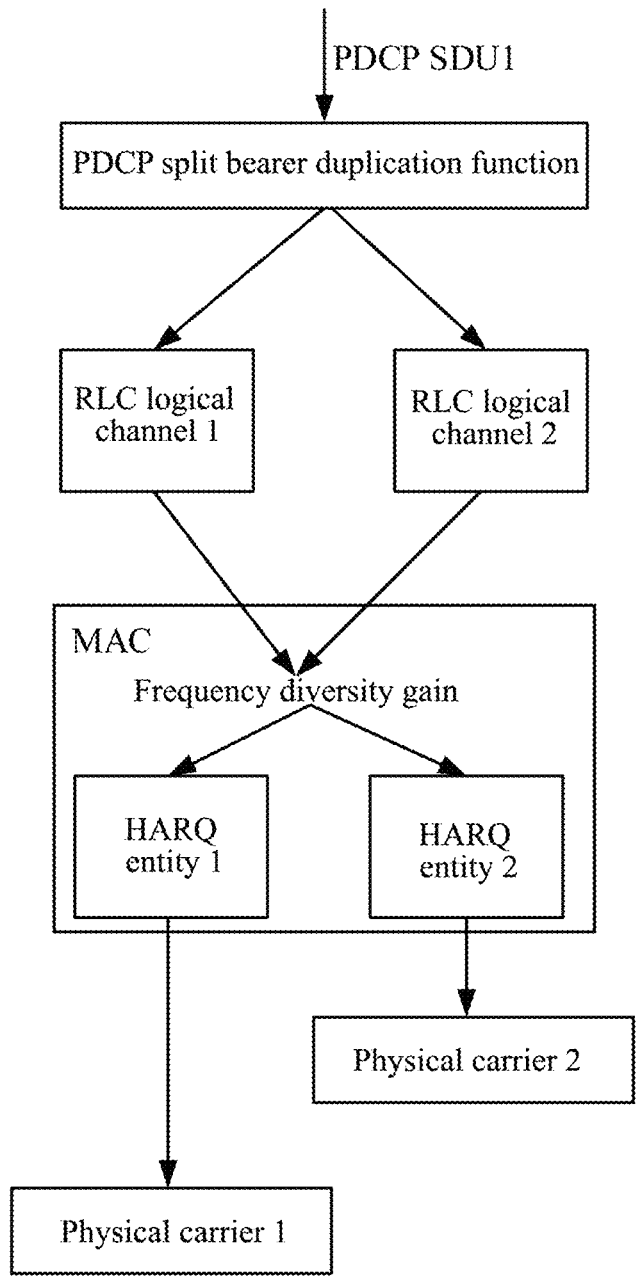
FIG. 2 shows a protocol architecture diagram of duplicate data transmission in a carrier aggregation scenario.

For ease of understanding, in the following it will be briefly described how to schedule duplicated data on different physical carriers. As shown in FIG. 2, the PDCP layer has a function of split bearer duplication, and data process of PDCP SDU1 is duplicated and encapsulated into PDCP PDU1 and PDCP PDU2, where the PDCP PDU1 and the PDCP PDU2 have the same content, that is, having the same data payload and the header. PDCP PDU1 and PDCP PDU2 are mapped to different radio link control (RLC) entities respectively, where the RLC entities put PDCP PDU1 and PDCP PDU2 on different logical channels (logical channel 1 and logical channel 2). For media access control (MAC), after learning which logical channels transmit duplicated data of the same PDCP PDU, the duplicated data is transmitted through different carriers by different hybrid automatic repeat request (HARQ) entities. For example, duplicated data carried in the logical channel 1 is transmitted on physical carrier 1 through HARQ entity 1, and duplicated data carried in logical channel 2 is transmitted on physical carrier 2 through HARQ entity 2.

Although the duplicate data transmission in the PDCP layer can effectively improve the reliability of data transmission by using the diversity gain, there is an obvious disadvantage that the solution leads to extremely low system resource utilization, that is, different resources are required to transmit the same content.

Figures 3, 4:
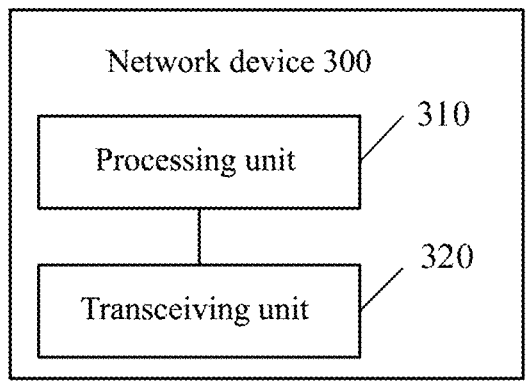
FIG. 3 is a schematic flowchart of a method for wireless communication according to an embodiment of the present application.
FIG. 4 is a schematic block diagram of a network device according to an embodiment of the present application.

FIG. 3 is a schematic flowchart of a method for wireless communication 200 according to an embodiment of the present application. In an embodiment, the method 200 can be applied to the system shown in FIG. 1, but is not limited thereto. As shown in FIG. 3, the method 200 includes the following.

In 210, a network device determines a transmission mode of a PDCP PDU, where the transmission mode includes a duplicate data transmission mode or a single link transmission mode.

In 220, the network device transmits the PDCP PDU to the terminal device according to the transmission mode of the PDCP PDU.

Specifically, the network device can flexibly determine the transmission mode of the PDCP PDU, that is, to adopt the duplicate data transmission mode or the single link transmission mode. The duplicate data transmission mode may be a mode that duplicating the PDCP PDU into a plurality of duplications as described above, which are transmitted in a plurality of links, i.e., the RLC layers in FIG. 2. The single link transmission mode may be a mode that a PDCP PDU is transmitted by using one link and is transmitted for once. The network device can use a determined transmission mode to transmit the PDCP PDU after the transmission mode is determined. For example, if the network device determines the transmission mode to be the single link transmission mode, the network device uses one link to transmit the PDCP PDU; if the network device determines the transmission mode to be the duplicate data transmission mode, the network device may select a plurality of links to transmit the duplicated data of the PDCP PDU.

Therefore, the method for transmitting data in the embodiment of the present application is beneficial for balancing resource utilization and reliability of data transmission.

In an embodiment, in the embodiment of the present application, the network device may determine a transmission mode of the PDCP PDU according to feedback information from the terminal device on a plurality of links between the network device and the terminal device, and may also perform channel estimation on uplink data transmitted on the plurality of links between the network device and the terminal device to obtain a first estimated value, so as to determine the transmission mode of the PDCP PDU.

It should be understood that the plurality of links herein may refer to all links between the network device and the terminal device, or may be a part of links between the network device and the terminal device.

In an embodiment, the plurality of links have a one-to-one correspondence with a plurality of carriers, and each of the plurality of links performs signal transmission through a corresponding carrier.

In an embodiment, the plurality of links mentioned in the embodiment of the present application may have a one-to-one correspondence with a plurality of physical layer carriers respectively in the case of carrier aggregation, or may be physical layer carriers having the same frequency or different frequencies corresponding to two base stations in a dual connectivity scenario.

In order to facilitate the understanding of the present application, a transmission mode of the PDCP PDU in the embodiment of the present application will be described in detail in the following two ways.

It should be understood that although manners A and B are separated in the following, the methods of the manner A and the manner B can be used in combination or in substitution without contradiction.

It should be understood that a predetermined range or a predetermined value mentioned in the embodiment of the present application may be related to a service with which the PDCP PDU is associated, and specifically, may be related to a reliability requirement of the associated service, and specifically may be related to a level of quality of service (QoS) with which the PDCP PDU is associated.

Manner A

The network device performs channel estimation on uplink data transmitted on the plurality of links between the network device and the terminal device to obtain a first estimated value; and determines the transmission mode of the PDCP PDU by using the first estimated value of each link.

In an embodiment, determining the transmission mode to be the duplicate data transmission mode when a difference value between first estimated values of each two of the plurality of links is less than or equal to a first predetermined value, and the first estimated value of each of the plurality of links is within a first predetermined range; or determining the transmission mode to be the single link transmission mode when a difference value between first estimated values of at least two links among the plurality of links is greater than the first predetermined value, or a first estimated value of at least one link among the plurality of links is not within the first predetermined range.

In an embodiment, the network device performs channel estimation on uplink data transmitted on the plurality of links between the network device and the terminal device within a first time range to obtain the first estimated value; determines the transmission mode of the PDCP PDU using the first estimated value obtained within the first time range; and transmits the PDCP PDU to the terminal device within a second time range by using the transmission mode.

In an embodiment, the manner A may be used in a time division duplex (TDD) mode.

Manner B

In an implementation manner, the network device determines a transmission mode of the PDCP PDU according to feedback information from the terminal device on a plurality of links between the network device and the terminal device.

In an embodiment, the feedback information from the terminal device on a plurality of links between the network device and the terminal device includes at least one of the following:

channel state information obtained by the terminal device on each of the plurality of links;

feedback of a result of data demodulation by the terminal device on each of the plurality of links, specifically, the terminal device performs data demodulation on each of the plurality of links separately and reports a result of the data demodulation, which mainly includes a HARQ acknowledgement (ACK) message and a non-acknowledgement (NACK) message;

a measurement result of a radio resource management (RRM) measurement by the terminal device on each of the plurality of links, for example, measurement of reference signal receiving power (RSRP) or reference signal receiving quality (RSRQ) for mobility management in layer 3, where for RRM measurement in high layer, the terminal device may perform measurement based on configuration information on the network device, that is, the network device configures the time that the terminal device performs the measurement;

a second estimated value obtained by the terminal device by performing channel estimation on a control signaling transmitted on each of the plurality of links; and a beam measurement result obtained by the terminal device by measuring a beam transmitted on each of the plurality of links.

In an embodiment, the feedback information includes the channel state information, the RRM measurement result, the second estimated value, and the beam measurement result; determining the transmission mode to be the duplicate data transmission mode when a difference value between values of feedback information of each two of the plurality of links is less than or equal to a second predetermined value, and a value of feedback information of each of the plurality of links is within a second predetermined range; or determining the transmission mode to be the single link transmission mode when a difference value between values of feedback information of at least two links among the plurality of links is greater than the second predetermined value, or a value of feedback information of at least one link among the plurality of links is not within the second predetermined range.

For example, the terminal device performs channel measurement on the plurality of links separately to generate CQIs, and reports the CQIs to the network device through an uplink control channel, if the CQIs corresponding to the plurality of links are similar to each other, and are in a certain predetermined rang, the network device decides to trigger a high-layer duplicate data transmission to improve the reliability of data transmission. The network device may also count values of CQI corresponding to each link in a time interval, and based on a statistical result of the CQI of each link, for example, statistically average CQI in a certain time interval, if the CQI is within a predetermined range, the network device triggers high-level duplicate data transmission.

In an embodiment, determining a transmission mode of the PDCP PDU according to feedback information on a plurality of links between the network device and the terminal device received from the terminal device within a third time range; the network device transmits the PDCP PDU to the terminal device within a fourth time range by using the transmission mode.

In an embodiment, the feedback information from the terminal device on a plurality of links between the network device and the terminal device includes feedback of the result of data demodulation by the terminal device on each link, where the feedback of the result of demodulation includes an acknowledgement ACK message or a negative acknowledgement NACK message; determining the transmission mode of the PDCP PDU according to at least one of a number of ACK messages or a number of NACK messages received on each link within the third time range.

In an embodiment, determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links within the third time range.

For example, the terminal device performs an HARQ feedback on demodulated data on a link, and the network device counts a number of ACK messages received on each link and a number of NACK messages received on each link separately. The transmission mode of the PDCP PDU to be transmitted in the next window is determined according to a statistical value of a certain time window (for example, 100 ms).

The determined transmission mode may be used for transmitting a PDCP PDU with a certain characteristic in a next time range, for example, for transmitting PDCP PDUs with a consistent reliability requirement.

The way to determine the transmission mode of the PDCP PDU according to at least one of a ratio of the number of ACK messages received on each link to the number of NACK messages received on the each link, or a difference value between ratios of a number of ACK messages to a number of NACK messages of any two links are described below with reference to several implementation manners. It should be understood that although the embodiment of the present application refers to the ratio of the number of ACK messages to the number of NACK messages, similar solutions fall within the protection scope of the embodiments of the present application, for example, a ratio of the number of ACK messages to the total number (the sum of the number of NACK messages and ACK messages).

In an implementation manner, determining the transmission mode of the PDCP PDU to be the duplicate data transmission mode when a ratio of the number of ACK messages received on each of the plurality of links to the number of NACK messages received on the each of the plurality of links is within a third predetermined range, and a difference value between ratios of a number of ACK messages to a number of NACK messages of any two of the plurality of links is less than or equal to a third predetermined value.

For example, if ratios of a number of ACKs to a number of NACKs on each of the plurality of links are similar to each other and are all within a predetermined range, for example, the number of ACK messages/(the number of ACK messages+the number of NACK messages)=[30%, 80%], then the network device decides to perform high-level data duplication transmission in the next statistical window.

In an implementation manner, determining the transmission mode of the PDCP PDU to be the single link transmission mode when there is the first link among the plurality of links, where a ratio of a number of ACK messages on the first link to a number of NACK messages on the first link is greater than a ratio of a number of ACK messages on any other link among the plurality of links to a number of NACK messages on the any other link among the plurality of links, and a difference value between the ratio of the number of ACK messages on the first link to the number of NACK messages on the first link and the ratio of the number of ACK messages on the any other link among the plurality of links to the number of NACK messages on any other link among the plurality of links is greater than or equal to a fourth predetermined value.

In an embodiment, the network device transmits the PDCP PDU to the terminal device by using the first link.

For example, if there is a link among a certain plurality of links, where a ratio of a number of ACK messages of that link and a number of NACK messages of that link is greater than a ratio of a number of ACKs of any other link to a number of NACKs of the any other link, and a difference between the ratios is greater than a certain threshold, for example, a number of ACK messages on a first link/(the number of ACK messages on the first link+a number of NACK messages on the first link)=90%, a number of ACK messages on a second link/(the number of ACK messages on the second link+a number of NACK messages on the second link)=50%, where a difference between the ratios is 40%, which is greater than a threshold, for example, 20%, the network device decides to perform a single link transmission on the first link in the next statistical window.

In an implementation manner, determining the transmission mode of the PDCP PDU to be the single link transmission mode when a ratio of the number of ACK messages received on each of the plurality of links to the number of NACK messages received on the each of the plurality of links is greater than or equal to a fifth predetermined value, and a difference value between ratios of a number of ACK messages to a number of NACK messages of any two of the plurality of links is less than or equal to a sixth predetermined value.

In an embodiment, the network device transmits the PDCP PDU to the terminal device by using a second link among the plurality of links, where the second link is a link having the highest ratio of a number of ACK messages to a number of NACK messages among the plurality of links.

For example, if ratios of a number of ACKs to a number of NACKs on the plurality of links are similar to each other and are all relatively high, for example, more than 70%, then the network device selects a link that has the highest ratio to perform the single link data transmission, while other links may be used to transmit data different than data on the currently selected link.

In an implementation manner, determining the transmission mode of the PDCP PDU to be the single link transmission mode or the duplicate data transmission mode when a ratio of the number of ACK messages received on each of the plurality of links to the number of NACK messages received on the each of the plurality of links is less than or equal to a seventh predetermined value.

For example, if ratios of a number of ACKs to a number of NACKs on the plurality of links are similar to each other and are all relatively low, for example, less than 30%, then the network device may choose to perform the high-layer duplicate data transmission mode or the single link transmission mode.

In an embodiment, selecting at least one link from the plurality of links according to the transmission mode of the PDCP PDU; performing link adaptation on the at least one link; and transmitting the PDCP PDU by using the at least one link after link adaptation.

Specifically, when a ratio of the number of ACK messages received on each of the plurality of links to the number of NACK messages received on the each of the plurality of links is less than or equal to a seventh predetermined value, the network device may use the single link transmission mode or the duplicate data transmission mode to transmit the PDCP PDU. Since a ratio of the number of ACK messages received on each link to the number of NACK messages received on the each link is less than or equal to a seventh predetermined value, it is indicated that channel quality of each link is poor, and a link adaptation can be performed on a selected link. That is, the PDCP PDU is transmitted on the selected link by using a lower modulation and coding scheme.

In an embodiment of the present application, the manner of determining the transmission mode of the PDCP PDU based on the number of ACKs and the number of NACKs is also applicable to other feedback information. For the sake of brevity, details are not described herein again.

In an embodiment of the present application, when the terminal device selects a part of the links to transmit the PDCP PDU, other links may be used to transmit another PDCP PDU.

In an embodiment of the present application, after determining the transmission mode of the PDCP PDU, a link for transmitting the PDCP PDU may be selected from the plurality of links according to the PDCP PDU transmission mode. If it is a duplicate data transmission mode, multiple or all of the plurality of links may be selected to perform PDCP PDU transmission. If it is a single link transmission mode, one of the plurality of links may be selected for PDCP PDU transmission.

In an embodiment, the link for transmitting the PDCP PDU may be selected from the plurality of links according to the link quality of the plurality of links.

For example, the link for transmitting the PDCP PDU may be selected from the plurality of links according to the first and second estimated values of each link as described above and at least one of an RRM measurement result, channel state information, a result of data demodulation and a beam measurement result.

FIG. 4 is a schematic block diagram of a network device 300 according to an embodiment of the present application. The network device 300 includes a processing unit 310 and a transceiving unit 320, where:

the processing unit 310 is configured to determine a transmission mode of a PDCP PDU, where the transmission mode includes a duplicate data transmission mode or a single link transmission mode;

the transceiving unit 320 is configured to transmit the PDCP PDU to the terminal device according to the transmission mode of the PDCP PDU.

In an embodiment, the processing unit 310 is further configured to:

determine a transmission mode of the PDCP PDU according to feedback information from the terminal device on a plurality of links between the network device and the terminal device.

In an embodiment, the processing unit 310 is further configured to:

perform channel estimation on uplink data transmitted on the plurality of links between the network device and the terminal device to obtain a first estimated value; and determine the transmission mode of the PDCP PDU by using the first estimated value of each link.

In an embodiment, the processing unit 310 is further configured to:

determine the transmission mode to be the duplicate data transmission mode when a difference value between first estimated values of each two of the plurality of links is less than or equal to a first predetermined value, and the first estimated value of each of the plurality of links is within a first predetermined range; or determine the transmission mode to be the single link transmission mode when a difference value between first estimated values of at least two links among the plurality of links is greater than the first predetermined value, or a first estimated value of at least one link among the plurality of links is not within the first predetermined range.

In an embodiment, the processing unit 310 is further configured to:

perform channel estimation on uplink data transmitted on the plurality of links between the network device and the terminal device within a first time range to obtain the first estimated value;

determine the transmission mode of the PDCP PDU using the first estimated value obtained within the first time range; and transmit the PDCP PDU to the terminal device within a second time range by using the transmission mode.

In an embodiment, the feedback information on the terminal device for plurality of links between the network device and the terminal device includes at least one of the following:

channel state information obtained by the terminal device on each of the plurality of links;

feedback of a result of data demodulation by the terminal device on each of the plurality of links;

a radio resource management RRM measurement result of an RRM measurement by the terminal device on each of the plurality of links;

a second estimated value obtained by the terminal device by performing channel estimation on a control signaling transmitted on each of the plurality of links; and a beam measurement result obtained by the terminal device by measuring a beam transmitted on each of the plurality of links.

In an embodiment, the feedback information includes the feedback information includes the channel state information, the RRM measurement result, the second estimated value, and the beam measurement result;

the processing unit 310 is further configured to:

determine the transmission mode to be the duplicate data transmission mode when a difference value between values of feedback information of each two of the plurality of links is less than or equal to a second predetermined value, and a value of feedback information of each of the plurality of links is within a second predetermined range; or determine the transmission mode to be the single link transmission mode when a difference value between values of feedback information of at least two links among the plurality of links is greater than the second predetermined value, or a value of feedback information of at least one link among the plurality of links is not within the second predetermined range.

In an embodiment, the processing unit 310 is further configured to:

determine the transmission mode of the PDCP PDU according to feedback information on a plurality of links between the network device and the terminal device received from the terminal device within a third time range;

transmit the PDCP PDU to the terminal device within a fourth time range by using the transmission mode.

In an embodiment, the feedback information from the terminal device on a plurality of links between the network device and the terminal device includes feedback of the result of data demodulation by the terminal device on each link, where the feedback of the result of demodulation includes an acknowledgement ACK message or a negative acknowledgement NACK message;

The processing unit 310 is further configured to:

determine the transmission mode of the PDCP PDU according to at least one of a number of ACK messages or a number of NACK messages received on each link within the third time range.

In an embodiment, the processing unit 310 is further configured to:

determine the transmission mode of the PDCP PDU from the plurality of links according to at least one of a ratio of the number of ACK messages received on each link to the number of NACK messages received on the each link, or a difference value between ratios of a number of ACK messages to a number of NACK messages of any two links within the third time range.

In an embodiment, the processing unit 310 is further configured to:

determine the transmission mode of the PDCP PDU to be the duplicate data transmission mode when a ratio of the number of ACK messages received on each of the plurality of links to the number of NACK messages received on the each of the plurality of links is within a third predetermined range, and a difference value between ratios of a number of ACK messages to a number of NACK messages of any two of the plurality of links is less than or equal to a third predetermined value.

In an embodiment, the processing unit 310 is further configured to:

determine the transmission mode of the PDCP PDU to be the single link transmission mode when there is the first link among the plurality of links, where a ratio of a number of ACK messages on the first link to a number of NACK messages on the first link is greater than a ratio of a number of ACK messages on any other link among the plurality of links to a number of NACK messages on the any other link among the plurality of links, and a difference value between the ratio of the number of ACK messages on the first link to the number of NACK messages on the first link and the ratio of the number of ACK messages on the any other link among the plurality of links to the number of NACK messages on any other link among the plurality of links is greater than or equal to a fourth predetermined value.

In an embodiment, the transceiving unit 320 is further configured to:

transmit the PDCP PDU to the terminal device by using the first link.

In an embodiment, the processing unit 310 is further configured to:

determine the transmission mode of the PDCP PDU to be the single link transmission mode when a ratio of the number of ACK messages received on each of the plurality of links to the number of NACK messages received on the each of the plurality of links is greater than or equal to a fifth predetermined value, and a difference value between ratios of a number of ACK messages to a number of NACK messages of any two of the plurality of links is less than or equal to a sixth predetermined value.

In an embodiment, the transceiving unit 320 is further configured to:

transmit the PDCP PDU to the terminal device by using a second link among the plurality of links, where the second link is a link having the highest ratio of a number of ACK messages to a number of NACK messages among the plurality of links.

In an embodiment, the processing unit 310 is further configured to:

determine the transmission mode of the PDCP PDU to be the single link transmission mode or the duplicate data transmission mode when a ratio of the number of ACK messages received on each of the plurality of links to the number of NACK messages received on the each of the plurality of links is less than or equal to a seventh predetermined value.

In an embodiment, the transceiving unit 320 is further configured to:

select at least one link from the plurality of links according to the transmission mode of the PDCP PDU;

perform link adaptation on the at least one link;

transmit the PDCP PDU by using the at least one link after link adaptation.

In an embodiment, the plurality of links have a one-to-one correspondence with a plurality of carriers, and each of the plurality of links performs signal transmission through a corresponding carrier.

It should be understood that the network device 300 may correspond to the network device in the method 200, where corresponding functions of the network device in the method 200 may be implemented. For the sake of brevity, no further details are provided herein.

Figure 5:
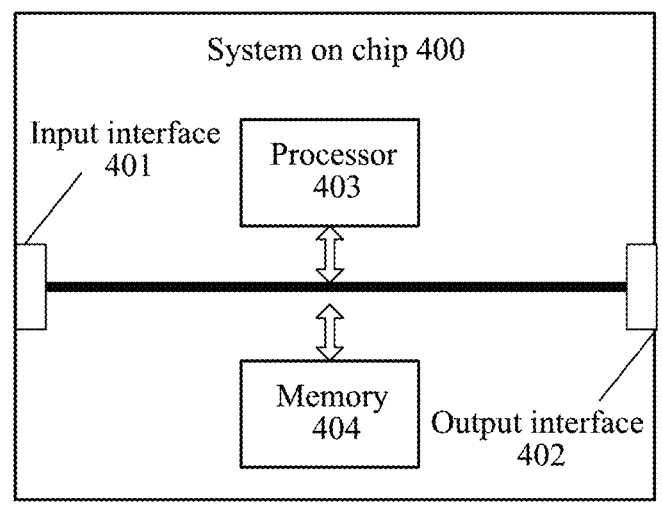
FIG. 5 is a schematic block diagram of a system on chip according to an embodiment of the present application.

FIG. 5 is a schematic structural diagram of a system on chip 400 according to an embodiment of the present application. The system on chip 400 in FIG. 5 includes an input interface 401, an output interface 402, a processor 403, and a memory 404 which may be connected by an internal communication connection line, where the processor 403 is configured to execute code in the memory 404.

In an embodiment, when the code is executed, the processor 403 implements the method performed by the network device in the method 200 shown in FIG. 2. For the sake of brevity, it will not be repeated here.

Figure 6:
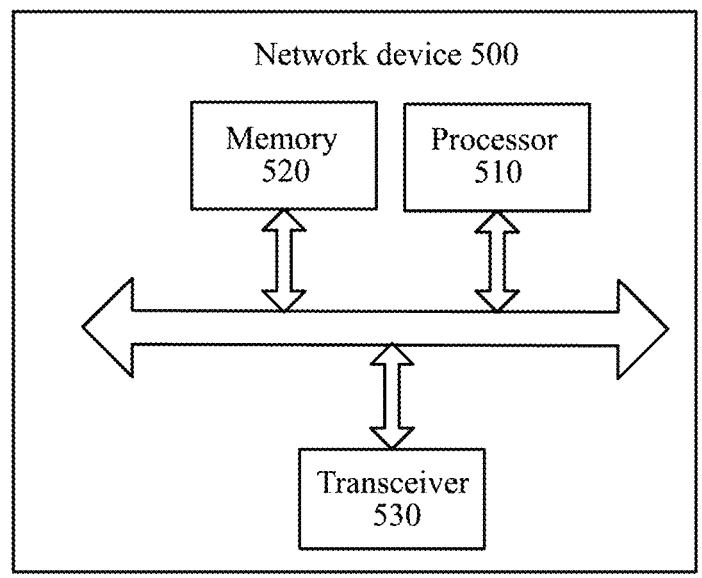
FIG. 6 is a schematic block diagram of a network device according to an embodiment of the present application.

FIG. 6 is a schematic block diagram of a network device 500 according to an embodiment of the present application. As shown in FIG. 6, the network device 500 includes a processor 510 and a memory 520. The memory 520 may have program code stored thereon, and the processor 510 may execute the program code stored in the memory 520.

Alternatively, as shown in FIG. 6, the network device 500 may include a transceiver 530, where an external communication of the transceiver 530 may be controlled by the processor 510.

In an embodiment, the processor 510 may call the program code stored in the memory 520 to perform the corresponding operations of the network device in the method 200 of FIG. 2, where details are not described herein for the sake of brevity.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical scheme. Professionals can use different methods for each specific application to implement the described functionality, but this kind of implementation should not be considered beyond the scope of the present application.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present application, it should be understood that the disclosed system, device, and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present application may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present application, in nature, or which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present application. The foregoing storage medium includes: a USB flash disk, a mobile hard disk, a read-only memory (ROM), a random access memory (RAM), a magnetic disk, or an optical disk, and the like which can store program codes.

The foregoing description is only specific embodiments of the present application; however, the scope of protection of the present application is not limited thereto, and changes or substitutions that can be readily think of by any person skilled in the art within the technical scope disclosed in the present application shall be covered by the scope of protection of the present application. Therefore, the scope of protection of the present application shall be subject to the scope of protection of the claims.

What is claimed is:

1. A method for wireless communication, comprising:
   determining, by a network device, a transmission mode of a packet data convergence protocol (PDCP) protocol data unit (PDU) according to feedback information from a terminal device on a plurality of links between the network device and the terminal device, wherein the transmission mode comprises a duplicate data transmission mode or a single link transmission mode; and
   transmitting, by the network device, the PDCP PDU to the terminal device according to the transmission mode of the PDCP PDU;
   wherein the feedback information from the terminal device on the plurality of links between the network device and the terminal device comprises: channel state information obtained by the terminal device on each of the plurality of links, a radio resource management (RRM) measurement result of an RRM measurement by the terminal device on each of the plurality of links, an estimated value obtained by the terminal device by performing channel estimation on a control signaling transmitted on each of the plurality of links, and a beam measurement result obtained by the terminal device by measuring a beam transmitted on each of the plurality of links;
   wherein the determining, by a network device, a transmission mode of a packet data convergence protocol (PDCP) protocol data unit (PDU) according to feedback information from a terminal device on a plurality of links between the network device and the terminal device, comprises:
   determining, by the network device, the transmission mode to be the duplicate data transmission mode when a difference value between values of feedback information of each two of the plurality of links is less than or equal to a first predetermined value, and a value of feedback information of each of the plurality of links is within a first predetermined range; or
   determining, by the network device, the transmission mode to be the single link transmission mode when a difference value between values of feedback information of at least two links among the plurality of links is greater than a first predetermined value, or a value of feedback information of at least one link among the plurality of links is not within a first predetermined range.

2. The method according to claim 1, wherein the determining, by the network device, a transmission mode of the PDCP PDU according to feedback information from the terminal device on a plurality of links between the network device and the terminal device, comprises:
   determining the transmission mode of the PDCP PDU according to feedback information on a plurality of links between the network device and the terminal device received from the terminal device within a first time range;
   the transmitting, by the network device, the PDCP PDU to a terminal device according to the transmission mode of the PDCP PDU comprises:
   transmitting, by the network device, the PDCP PDU to the terminal device within a second time range by using the transmission mode.

3. The method according to claim 2, wherein the feedback information from the terminal device on the plurality of links between the network device and the terminal device further comprises feedback of a result of data demodulation by the terminal device on each of the plurality of links, wherein the feedback of the result of demodulation comprises an acknowledgement (ACK) message or a negative acknowledgement (NACK) message;
   the determining, by the network device, a transmission mode of the PDCP PDU according to feedback information from the terminal device on a plurality of links between the network device and the terminal device, comprises:
   determining the transmission mode of the PDCP PDU according to at least one of a number of ACK messages or a number of NACK messages received on each link within the first time range.

4. The method according to claim 3, wherein the determining the transmission mode of the PDCP PDU according to at least one of a number of ACK messages received on each link or a number of NACK messages received on the each link within the first time range comprises:
   determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links within the first time range.

5. The method according to claim 4, wherein the determining the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links comprises:
   determining the transmission mode of the PDCP PDU to be the duplicate data transmission mode when a ratio of the number of ACK messages received on each of the plurality of links to the number of NACK messages received on the each of the plurality of links is within a second predetermined range, and a difference value between ratios of a number of ACK messages to a number of NACK messages of any two of the plurality of links is less than or equal to a second predetermined value.

6. A computer readable medium, storing program code for execution by a network device, wherein the program code comprising instructions for performing the method of claim 1.

7. A network device, comprising: a processor and a transceiver, wherein:
the processor is configured to determine a transmission mode of a packet data convergence protocol (PDCP) protocol data unit (PDU) according to feedback information from a terminal device on a plurality of links between the network device and the terminal device, wherein the transmission mode comprises a duplicate data transmission mode or a single link transmission mode; and
the transceiver is configured to transmit the PDCP PDU to the terminal device according to the transmission mode of the PDCP PDU;
wherein the feedback information from the terminal device on the plurality of links between the network device and the terminal device comprises: channel state information obtained by the terminal device on each of the plurality of links, a radio resource management (RRM) measurement result of an RRM measurement by the terminal device on each of the plurality of links, an estimated value obtained by the terminal device by performing channel estimation on a control signaling transmitted on each of the plurality of links, and a beam measurement result obtained by the terminal device by measuring a beam transmitted on each of the plurality of links;
the processor is further configured to:
determine the transmission mode to be a duplicate data transmission mode when a difference value between values of feedback information of each two of the plurality of links is less than or equal to a first predetermined value, and a value of feedback information of each of the plurality of links is within a first predetermined range; or
determine the transmission mode to be a single link transmission mode when a difference value between values of feedback information of at least two links among the plurality of links is greater than a first predetermined value, or a value of feedback information of at least one link among the plurality of links is not within a first predetermined range.

8. The network device according to claim 7, wherein the processor is further configured to:
determine the transmission mode of the PDCP PDU according to feedback information on a plurality of links between the network device and the terminal device received from the terminal device within a first time range;
transmit the PDCP PDU to the terminal device within a second time range by using the transmission mode.

9. The network device according to claim 8, wherein the feedback information from the terminal device on the plurality of links between the network device and the terminal device further comprises feedback of a result of data demodulation by the terminal device on each of the plurality of links, wherein the feedback of the result of demodulation comprises an acknowledgement (ACK) message or a negative acknowledgement (NACK) message;
the processor is further configured to:
determine the transmission mode of the PDCP PDU according to at least one of a number of ACK messages or a number of NACK messages received on each link within the first time range.

10. The network device according to claim 9, wherein the processor is further configured to:
determine the transmission mode of the PDCP PDU according to at least one of a ratio of the number of ACK messages received on each link to the number of NACK messages received on the each link, or a difference value between ratios of a number of ACK messages to a number of NACK messages of any two links among the plurality of links within the first time range.

11. The network device according to claim 10, wherein the processor is further configured to:
determine the transmission mode of the PDCP PDU to be the duplicate data transmission mode when a ratio of the number of ACK messages received on each of the plurality of links to the number of NACK messages received on the each of the plurality of links is within a second predetermined range, and a difference value between ratios of a number of ACK messages to a number of NACK messages of any two of the plurality of links is less than or equal to a second predetermined value.

* * * * *